US011086359B2

(12) United States Patent
Dees et al.

(10) Patent No.: US 11,086,359 B2
(45) Date of Patent: Aug. 10, 2021

(54) PERIPHERALS IN A WIRELESS DOCKING SYSTEM

(71) Applicant: KONINKLIJKE PHILIPS N.V., Eindhoven (NL)

(72) Inventors: Walter Dees, Eindhoven (NL); Franciscus Antonius Maria Van De Laar, Eindhoven (NL); Paul Anthony Shrubsole, Eindhoven (NL); Pieter Joseph Mathias Custers, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 179 days.

(21) Appl. No.: 15/110,533

(22) PCT Filed: Jan. 5, 2015

(86) PCT No.: PCT/EP2015/050020
§ 371 (c)(1),
(2) Date: Jul. 8, 2016

(87) PCT Pub. No.: WO2015/104227
PCT Pub. Date: Jul. 16, 2015

(65) Prior Publication Data
US 2016/0334837 A1 Nov. 17, 2016

(30) Foreign Application Priority Data

Jan. 10, 2014 (EP) .................................... 14150779

(51) Int. Cl.
G06F 1/16 (2006.01)
H04L 29/08 (2006.01)
(Continued)

(52) U.S. Cl.
CPC ........ G06F 1/1632 (2013.01); G06F 13/4081 (2013.01); H04L 67/16 (2013.01); H04W 4/80 (2018.02); H04W 84/12 (2013.01)

(58) Field of Classification Search
None
See application file for complete search history.

(56) References Cited

U.S. PATENT DOCUMENTS 8,254,992 B1 8/2012 Ashenbrenner
9,112,301 B2 8/2015 Chang
(Continued)

FOREIGN PATENT DOCUMENTS

JP 2004199328 A 7/2004
WO WO2012117306 A1 9/2012

OTHER PUBLICATIONS

Ng, Ping Chung et al., "Throughput Analysis of IEEE802.11 Multi-Hop Ad Hoc Networks", IEEE/ACM Transactions on Networking, vol. 15, Issue 2, Apr. 2007, pp. 309-322.
(Continued)

Primary Examiner — Henry Tsai
Assistant Examiner — John B Roche

(57) ABSTRACT

A wireless docking system has a host (100) and at least one dockee (120,130,140). The host accommodates at least one wireless docking environment including at least one peripheral (110,111,112). The host has a host communication unit (102) for providing wireless communication and a host processor (101) arranged for docking the dockee into the wireless docking environment. The dockee has a dockee communication unit (121) for providing said wireless communication, and a dockee processor (122) arranged for docking into the wireless docking environment. The dockee has at least one dockee peripheral (123). The dockee processor advertises the dockee peripheral, and, upon receiving a coupling request from the host, couples to the host for
(Continued)

providing connection data and control of the dockee peripheral by the host. The host processor advertises the set of peripherals including the dockee peripheral for making the dockee peripheral available for use as a further peripheral in the wireless docking environment.

19 Claims, 4 Drawing Sheets

(51) Int. Cl.
*G06F 13/40* (2006.01)
*H04W 4/80* (2018.01)
*H04W 84/12* (2009.01)

(56) References Cited

U.S. PATENT DOCUMENTS

| | | | |
|---|---|---|---|
| 9,360,200 | B2 | 6/2016 | Peil |
| 9,426,184 | B2 * | 8/2016 | Huang ............... H04L 65/1069 |
| 9,445,449 | B2 | 9/2016 | Dees |
| 2002/0051012 | A1 | 5/2002 | Gomes et al. |
| 2002/0181686 | A1 | 12/2002 | Howard et al. |
| 2005/0160479 | A1 | 7/2005 | Kubota |
| 2008/0056285 | A1 | 3/2008 | Quinn |
| 2012/0265913 | A1 * | 10/2012 | Suumaki ............... H04W 4/008 710/303 |
| 2013/0086056 | A1 | 4/2013 | Dyor |
| 2013/0103873 | A1 * | 4/2013 | Reilly ............... H04N 21/4126 710/303 |
| 2013/0106989 | A1 | 5/2013 | Gage et al. |
| 2014/0010220 | A1 | 1/2014 | Huang |
| 2014/0013014 | A1 | 1/2014 | Huang |
| 2014/0201415 | A1 * | 7/2014 | Huang .................... G06F 13/00 710/303 |
| 2016/0014172 | A1 | 1/2016 | Van De Laar |

OTHER PUBLICATIONS

Mills, D. et al., "Network Time Protocol Version 4: Protocol and Algorithms Specification", Internet Engineering Task Force (IETF), in Request for Comments 5905, Jun. 2009, pp. 1-110 https://tools.ietf.org/html/rfc5905.

"Photography—Electronic Still Picture Imaging—Picture Transfer Protocol (PTP), for Digital Still Photography Devices", Photographic and Imaging Manufacturers Association, Inc., PIMA 15740:2000, Approved Jul. 5, 2000, First Edition http://people.ece.cornell.edu/land/courses/ece4760/FinalProjects/f2012/jmv87/site/files/pima15740-2000.pdf.

"Universal Serial Bus Still Image Capture Device Definition", Revision 1.0, Jul. 11, 2000, http://www.usb.org/developers/devclass_docs/usb_still_img10.pdf .

"Universal Serial Bus Device Class Definition for Audio Devices", v. 1.0, section 3.4, Release 1.0, Mar. 18, 1998, http://www.usb.org/developers/devclass_docs/audio10.pdf.

"Wi-Fi Peer-to-Peer (P2P) Technical Specification", Version 1.2, 2010, from the Wi-Fi Alliance.

"Specification of the Bluetooth System, Master Table of Contents & Compliance Requirements", Core Package version 4.0, TOC, issued: Jun. 30, 2010.

* cited by examiner

PERIPHERALS IN A WIRELESS DOCKING SYSTEM

FIELD OF THE INVENTION

The invention relates to wireless docking system comprising a host and at least one dockee, the host and the dockee arranged for docking via wireless communication, the host arranged for accommodating at least one wireless docking environment and advertising a set of peripherals for making the peripherals available for use in the wireless docking environment, the docking enabling the dockee to use the set of peripherals, the host comprising a host communication unit for providing said wireless communication, a host processor arranged for docking the dockee into the wireless docking environment, and the dockee comprising a dockee communication unit for providing said wireless communication, and a dockee processor arranged for docking into the wireless docking environment.

The invention further relates to a host and a dockee for use in the above system, and a method and a computer program product of wireless docking.

The invention relates to the field of wireless communication, e.g. via Wi-Fi, and more specific to a setup of peripherals made available in a wireless docking system having a host and multiple dockees. For example, a host may be a personal computer and the dockees may be mobile phones, laptop computers, tablet computers, etc.

BACKGROUND OF THE INVENTION

Wireless docking is known, for example, from WO 2012/117306A1. A wireless docking station enables a wireless secured communication between at least one slave device and a master device.

Wired docking stations for portable electronic devices typically have only a single physical docking connector to dock one device at a time. The docking station may provide the portable device with power and peripheral functions not provided by the device itself, for example a large(r) screen, high(er) quality speakers, mouse and keyboard. The wireless docking station may be a wireless docking host (WDH) that accommodates one or more wireless docking environments, each wireless docking environment making available a respective set of peripherals.

Wireless docking in a system having a host and dockees may be based on using a Wi-Fi (as described in IEEE802.11) based wireless docking station. Peripherals are locally coupled to the host through a wire or wirelessly connected, and include devices like a USB mouse, HDMI display, Bluetooth headset. The coupling, known as such, is achieved through a set of message exchange protocols over a wireless link (e.g. Wi-Fi).

Docking into a selected wireless docking environment enables a mobile device (called dockee) to access the set of peripherals made available in the wireless docking environment. The wireless docking host may provide information about its presence through a Wi-Fi beacon that dockees can use to select and initiate connections with a chosen WDH. Alternatively, Near Field Communication (NFC) tags associated with the WDH or other out of band means (such as using the communications interface from a wireless power system) are used to select and initiate a WDH to dock with.

SUMMARY OF THE INVENTION

The wireless docking system accommodates at least one wireless docking environment to provide access to one or more peripherals that are coupled to the host. Various applications may require various peripherals. However, such peripherals may not be available.

It is an object of the invention to provide a system for wireless docking that enables making available additional peripherals in the wireless docking environment.

For this purpose, according to a first aspect of the invention, in the wireless docking system as described in the opening paragraph, the dockee comprises at least one dockee peripheral, the dockee processor being arranged for advertising the dockee peripheral, and, upon receiving a coupling request from the host, coupling to the host for providing connection data and control of the dockee peripheral by the host, and the host processor being arranged for sending the coupling request to the dockee for obtaining the connection data and control of the dockee peripheral by the host, and advertising the set of peripherals including the dockee peripheral for making the dockee peripheral available for use as a further peripheral in the wireless docking environment.

For this purpose, according to a further aspect of the invention, a dockee for use in the above wireless docking system is arranged for wireless docking via wireless communication, the dockee comprising a dockee communication unit for providing said wireless communication, a dockee processor arranged for docking into the wireless docking environment, the dockee comprising at least one dockee peripheral, and the dockee processor being arranged for advertising the dockee peripheral, and, upon receiving a coupling request from the host, coupling to the host for providing connection data and control of the dockee peripheral by the host.

For this purpose, according to a further aspect of the invention, a host for use in the above wireless docking system is arranged for docking via wireless communication and for accommodating at least one wireless docking environment and advertising a set of peripherals for making the peripherals available for use in the wireless docking environment, the host comprising a host communication unit for providing said wireless communication, a host processor arranged for docking the dockee into the wireless docking environment, the host processor being arranged for sending a coupling request to the dockee for obtaining connection data and control of the dockee peripheral by the host, and advertising the set of peripherals including the dockee peripheral for making the dockee peripheral available for use as a further peripheral in the wireless docking environment.

For this purpose, according to a further aspect of the invention, a method of wireless docking in a host is provided for use in the above wireless docking system, the host and the dockee arranged for docking via wireless communication, the host arranged for accommodating at least one wireless docking environment and advertising a set of peripherals for making the peripherals available for use in the wireless docking environment, the docking enabling the dockee to use the set of peripherals, the dockee comprising at least one dockee peripheral, the method comprising docking the dockee into the wireless docking environment, sending a coupling request to the dockee for obtaining connection data and control of the dockee peripheral by the host, and advertising the set of peripherals including the dockee peripheral for making the dockee peripheral available for use as a further peripheral in the wireless docking environment.

For this purpose, according to a further aspect of the invention, a method of wireless docking in a dockee is provided for use in the above wireless docking system, the host and the dockee arranged for docking via wireless communication, the host arranged for accommodating at least one wireless docking environment and advertising a set of peripherals for making the peripherals available for use in the wireless docking environment, the docking enabling the dockee to use the set of peripherals, the dockee comprising at least one dockee peripheral, the method comprising docking into the wireless docking environment, and, advertising the dockee peripheral, and, upon receiving a coupling request from the host, coupling to the host for providing connection data and control of the dockee peripheral by the host.

For this purpose, according to a further aspect of the invention, the computer program product as described in the opening paragraph comprises a program that is operative to cause a processor to perform any one of the methods as described above.

The measures have the effect that the dockee peripheral is made available for use as a peripheral in the wireless docking environment as accommodated by the host. Accommodating the wireless docking environment comprises initiating the required communication, bookkeeping and further protocol handling and configuration management of the docking functionality provided to dockees. To make the dockee peripheral available for use connection data and control of the dockee peripheral is obtained by the host and the connection data is subsequently applied in the wireless docking environment. Thereto the dockee processor is arranged for advertising the dockee peripheral, and, upon receiving a coupling request from the host, coupling to the host for providing the connection data and control of the dockee peripheral by the host. The connection data comprises information to be used in connecting to the dockee and using the dockee peripheral. The control of the dockee peripheral by the host enables the host to make the dockee peripheral available for use as a peripheral. The connection data enables making a connection to the dockee by the host or a further dockee to use the dockee peripheral. The dockee peripheral is made available for use as a further peripheral in the wireless docking environment by including the dockee peripheral in the set of peripherals of the wireless docking environment. So the set is extended and presented as the set of peripherals of the wireless docking environment to further dockees by advertising the set including the dockee peripheral. Subsequently, a further dockee may actually dock into the wireless docking environment and use the dockee peripheral as if it was a traditional peripheral connected to the host. The further dockee may use standard docking software and protocols for said docking, because said dockee peripheral is made available in the wireless docking environment as a standard peripheral. Advantageously one or more additional peripherals, i.e. said dockee peripherals, are made available in the wireless docking environment to provide access to the one or more dockee peripherals that are now coupled to the host.

The invention is also based on the following recognition. Traditionally docking assumes that the dockee only uses peripherals that are already coupled to the host. Dockee peripherals are internal peripherals or peripheral functions (speaker, microphone, sensors, display, GPS, camera) from portable devices such as mobile phones or tables, which are normally not accessible by other devices. In this document the words "dockee peripheral" define a unit internal to the dockee, as opposed to an external peripheral attached to a dockee e.g. through a wireless connection. The internal unit has a peripheral character, i.e. directly interacts with the physical outside world. Making such an internal unit available for use as a peripheral by a further dockee in a wireless environment implies device level use by the further dockee. Making a dockee peripheral available for use implies enabling direct use of functions that such a peripheral offers, like displaying data, making sound, or getting input from a user.

Document US 2013/0103873 describes a system for music playback. The music system enables connecting a portable playback device to a wireless dock on a network, and subsequently enables browsing, selecting and play back of selected music on the docked portable by further devices on the network. The music system makes music present on the docked portable accessible for playback by a further device on the network. The music is made accessible at file level or application level. However, the system does not enable the further device on the network to use a peripheral of the docked portable as a peripheral device. The storage device level is exclusively exercised and controlled by the docked portable. It is not even disclosed to the network on which storage device the music is stored, as only the content is outputted to the network.

The inventors propose a docking method to make dockee peripherals (individual peripheral units or functions from one or more mobile devices in a wireless local network) available at device level to a further dockee in order to make new functions available and/or to extend existing functions with input from one or more portable devices. Using a peripheral at device level is usually performed via a device driver level control interface.

Outside docking systems mobile devices may have input/output units and sensors that are available to applications running locally on the mobile device. Such applications may cooperate and communicate with other applications on other computers, e.g. a further mobile device, to exchange peripheral data. However, such schemes always require dedicated applications on all cooperating devices. The inventors have seen that, using and extending a docking system, such mobile input/output units can be considered to be dockee peripherals that are built in, or coupled to, such devices. They have endeavored to make such dockee peripherals directly accessible and useable at device level for other dockees in the wireless docking system, by coupling the dockee peripherals to the host, which host makes the dockee peripherals subsequently available in a respective wireless docking environment.

Optionally, in the dockee, the dockee processor is arranged for
 receiving a synchronization command for activating a function of the dockee peripheral at a time as indicated by the synchronization command; and/or
 generating a synchronization command for activating a function of at least one peripheral in the wireless docking environment at a time as indicated by the synchronization command.

Advantageously various dockee peripherals are synchronized via the synchronization command.

Optionally, in the dockee, the dockee processor is arranged for, upon receiving a coupling request and/or a use request, determining whether a user of the dockee agrees to making the dockee peripheral accessible as a further peripheral in the wireless docking environment. Advantageously, the user of the dockee is enabled to decide whether to make the dockee peripheral available.

Optionally, in the dockee, the dockee processor is arranged for, when a use mode of the dockee peripheral is engaged, determining whether a user of the dockee requires to use the dockee peripheral, and subsequently limiting or terminating the use of the dockee peripheral as a further peripheral in the wireless docking environment.

Advantageously, the user of the dockee is enabled to regain control over the dockee peripheral.

Optionally, in the dockee, the dockee processor is arranged for, upon receiving a coupling request and/or a use request, making the dockee peripheral accessible as a USB peripheral in the wireless docking environment. Advantageously, the dockee peripheral will be perceived by further dockees as a normal USB peripheral.

Optionally, in the host device, the host processor is arranged to accommodate a configuration mode in which the wireless docking environment is configurable for making the dockee peripheral accessible as a further peripheral in the wireless docking environment.

Advantageously, in the configuration mode, the host detects the availability of dockee peripherals and establishes the configuration of the wireless docking environment.

The host processor may be arranged to engage the configuration mode by at least one of
 detection of a dockee being docked;
 a user input via a user interface of the host;
 a configuration message from the dockee as received by the host.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
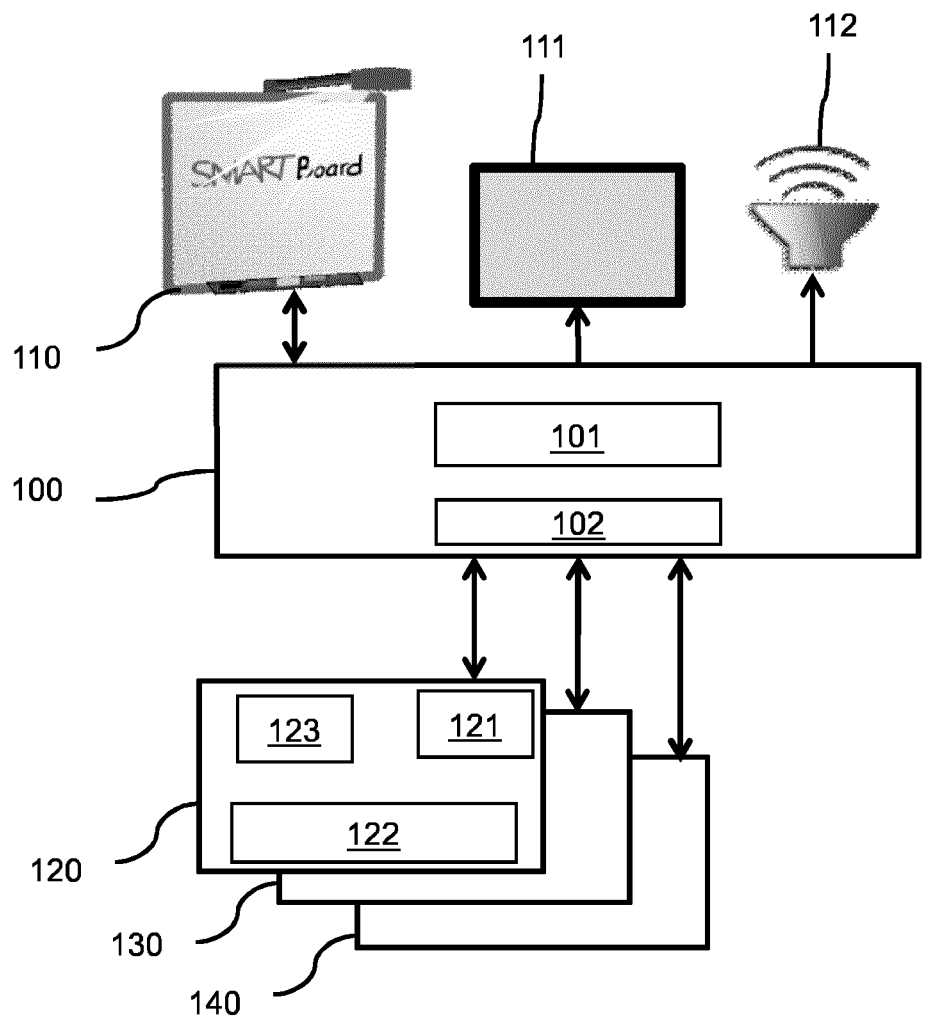
FIG. 1 shows a wireless docking system.

Wireless docking is about enabling portable devices (so called dockees, wireless dockees or WDs) to wirelessly connect to a group of peripherals, so that applications on the portable device can make use of these peripherals to improve the experience and productivity of working/interacting with these applications. The grouping of peripherals, the discovery/advertisement of groups of peripherals, managing the connections to groups of peripherals, is performed by a so-called wireless docking host (WDH), which makes its functionality available through a wireless docking protocol.

Possible wireless dockees include (but are not limited to) dockee phones, laptops, tablets, portable media players, cameras, electronic watches. Possible WDHs include (but are not limited to) dedicated wireless docking station devices, display devices, audio devices, printers, PCs. The wireless docking host may also be a small (PC like) dongle with a display, USB and audio interface. Possible peripherals include (but are not limited to) wireless mice, keyboards, display devices, audio devices, webcams, printers, storage devices, USB hubs. These peripherals are connected by wire or wirelessly to the WDH. The WDH can use technologies such as Wi-Fi Miracast and USB tunneling over Wi-Fi to make their functionality available through the wireless network to other devices such as dockees. Wired peripherals may be connected to the wireless host.

The wireless docking system may comprise at least two portable devices (wireless dockees) and a wireless docking host. In operation, the wireless docking host is attached to peripherals and configured to offer a set of the peripherals for docking in a wireless docking environment. A first wireless dockee is wirelessly connected to the wireless docking host for docking. The wireless dockee is configured to make one or more of its functions/capabilities/subsystems available as dockee peripherals to the wireless docking host as additional peripherals for the wireless docking environment. The wireless docking host will advertise the set of peripherals for docking including one or more dockee peripherals of the first wireless dockee. A further wireless dockee may connect to the wireless docking host to dock into the wireless docking environment having one or more of the dockee peripherals of the first wireless dockee. Hence the further dockee acquires control over these I/O peripherals through common wireless messaging and streaming protocols (in short called the docking process), as further elucidated below.

Since operating systems typically enable plug & play device management functions, peripherals typically get automatically enumerated and associated with the correct driver, after which their functionality becomes readily and transparently available to all applications running on that OS. In particular, the dockee peripherals may be enumerated as USB devices. The functions/capabilities/subsystems of the one or more WDs could be provided over Wi-Fi (or other network) by using a USB tunneling protocol over Wi-Fi, such as Wi-Fi Serial Bus or Media Agnostic USB, or USB/IP software. Using USB as facilitating protocol also immediately determines the master/slave roles that each WD takes regarding each of these peripherals. By the virtue of these functions/capabilities/subsystems of the one or more docked WDs being exposed as "normal" peripherals, another WD can easily control/integrate all these peripheral functions within applications running on the another WD or by using standard operating system functions, such as controlling the volume of each microphone or speaker connected to the system using a standard volume control function shown as a panel on the display.

FIG. 1 shows a wireless docking system. The system includes a host 100 for wireless communication with multiple dockees 120,130,140, for example mobile phones, laptops or tablet computers. Only the first dockee 120 is described in detail below, but further dockees have similar components and functions. The host is coupled to a number of peripherals 110,111,112 for rendering audio or video (AV) data. It is noted that in this document AV data is used for any type of video data, audio data or a combination of video and audio data. The peripherals may include video output devices like a beamer or a display screen 111, graphical input/output devices like a smartboard 110 or a touch screen, audio output devices like a loudspeaker system 112 or a headphone, user control devices like a mouse or a room control unit; data processing devices like a data storage unit or a printer.

The host 100 has a host communication unit 102 for providing said wireless communication, for example a WiFi unit, well known as such. The host further has a host processor 101 arranged for docking the dockee into a wireless docking environment for providing access to the peripheral and enable use of the peripheral for the dockee. The process of docking a wireless device into a wireless docking environment is a process of establishing a data link via the available radio channel such as WiFi or Bluetooth, and is known as such as discussed above with reference to WO 2012/117306A1. A description of Bluetooth can be found, for example, in Bluetooth Specification, Core Package version 2.1+EDR, issued: 26 Jul. 2007. The host accommodates at least one wireless docking environment and is arranged for making the various peripherals available for use in the respective wireless docking environments. The docking process involves providing access for the dockee to one or more peripherals as available in the selected wireless docking environment.

The dockee 120 has a dockee communication unit 121 for providing said wireless communication with the host. In practice, there may be multiple communication units for that purpose, for example Bluetooth, Wi-Fi and 60 GHz. The dockee further has a dockee processor 122 arranged for docking, as a dockee, with the host into the wireless docking environment for getting access to the at least one peripheral. For example, to the dockee, control is provided over a peripheral for AV data to be rendered, e.g. rendering video on a display.

The dockee 120 is provided with a dockee peripheral 123. For example, the dockee peripheral may be at least one of a microphone, a loudspeaker, a camera, a display, a touch screen, a mouse, a keyboard, a communication unit, a light sensor, a temperature sensor, an orientation sensor, a location sensor. The dockee peripheral may also be part of a display, e.g. a window.

In the wireless docking system the host processor is arranged for sending a coupling request to the dockee, and making the dockee peripheral accessible as a further peripheral in the wireless docking environment. The dockee processor is arranged for, upon receiving a coupling request from the host, coupling the dockee peripheral to the host. Further details are described later.

Optionally, the dockee processor is arranged for sending a peripheral capability signal to the host indicative of the dockee peripheral unit being available for coupling as a further peripheral. The peripheral capability signal may be send during or even before the docking process. The peripheral capability signal may be sent in response to a coupling request received from the host, or in response to an inquiry message, or unrequested. In the host, the host processor is arranged for receiving the peripheral capability signal from the dockee and, upon receiving the peripheral capability signal, making the dockee peripheral accessible as a further peripheral in the wireless docking environment. Further details are described later.

Optionally, the system includes a further dockee 130,140. The further dockee has a further dockee processor arranged for, upon docking into the wireless docking environment, using the dockee peripheral. For example, the further dockee may have an application that requires a particular peripheral function that is a function of a dockee peripheral, e.g. a dockee camera. In the host, the host processor is arranged for docking the further dockee into the wireless docking environment. Upon docking the further dockee, the host processor sends a use request to the dockee, the use request indicating that the dockee peripheral is to be used in the wireless docking environment, and accommodates transfer of signals between the dockee peripheral unit and the further dockee. The dockee processor is arranged for, upon receiving the use request from the host, engaging a use mode of the dockee peripheral and transferring signals between the dockee peripheral unit and the wireless docking environment. Further details are described later.

In the docking system, a dockee may automatically search for a signal coming from the WDH to initiate docking Said searching for such a signal may start after being triggered by the user, after which upon receiving the signal initiates one or more actions to dock to the WDH. The first option has the benefit that it always enabled and always works, the second option has the benefit of requiring less battery power.

In the docking system, various dockees may receive different sets of peripheral functions that can be accessed in respective, different wireless docking environments. Also, the host, e.g. a PC, may make available to dockee shared peripherals as well as exclusive peripherals, whereby exclusive peripherals (i.e. peripherals that can only accept or provide data from/to a single source) may be handled as follows:

1) a window on a display may be made available instead of the entire display. Effectively, the exclusive display is made into a shared peripheral. When a dockee is in focus, the mouse/keyboard control is assigned to that dockee;
2) a hotkey is provided to switch between dockees, or to a host PC itself, for using a display in full screen;
3) a method that allows a WDH to forcefully release peripherals from a dockee and give them to another dockee.

Figure 2:
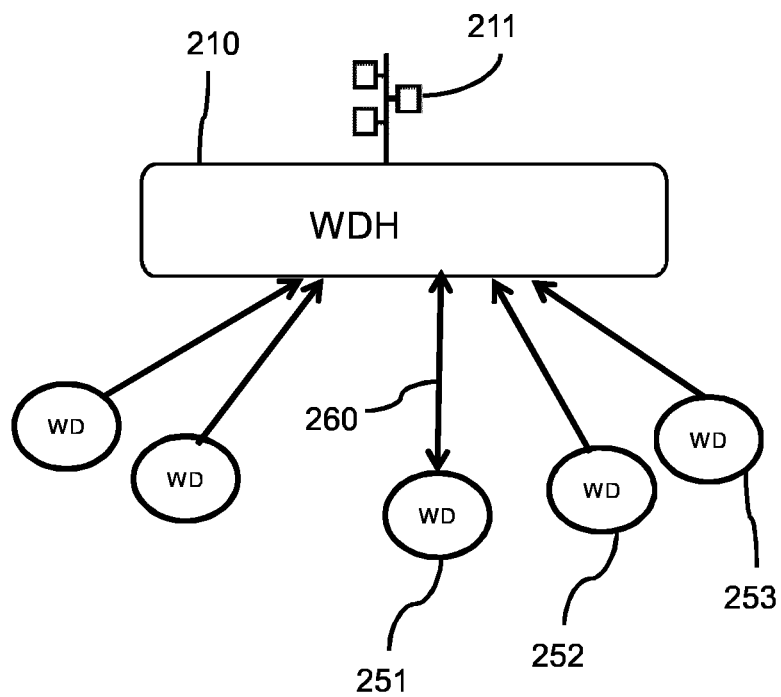
FIG. 2 shows an example of a docking system having a wireless docking host and dockees.

FIG. 2 shows an example of a docking system having a wireless docking host and dockees. The figure shows a Wireless Docking Host (WDH) 210 connected to a set of peripherals 211, for example a display, audio speakers, and other peripherals. The peripherals may also be coupled via a peripheral interface, like an Ethernet connection for high speed access to peripherals or internet access, a USB interface which may support multiple peripheral connections, or HDMI. Various dockees 251,252,253 are shown as being docked into a wireless docking environment as provided by the host 210. The dockees 252,253 provide access to dockee peripherals inside the respective dockee. The dockee peripheral is coupled to the host and made available in the wireless docking environment accommodated by the host. A further dockee 251, which is docked into the respective wireless docking environment, may access the dockee peripheral (actually located in a different peripheral) as indicated by a bidirectional arrow 260.

The Figure illustrates an example of the invention, e.g. a WDH in a meeting room connected to a set of peripherals (e.g. display, audio speakers, and number of other peripherals), with a set of WDs being simultaneously connected to the WDH using Wi-Fi Direct, whereby the WDH is a Wi-Fi Direct Group Owner (GO). The WDs indicated to be coupled by a unidirectional arrow are docked with the WDH and each of these offers some of their capabilities (e.g. microphone, speaker, sensor) as peripherals to be managed by the WDH, so that these can be added to the set of peripherals that another WD can dock with.

Once the further dockee 251 is docked it cannot only use the peripherals that were initially connected to the WDH, but also use the other WD's capabilities offered as dockee peripherals to dock with. The further dockee can now run applications that aggregate the use of one or more of these peripherals, for example an application that has control over enabling or disabling the audio input and output functions on the other WDs.

In practice, a wireless docking environment may initially only have the host coupled to some traditional peripherals, e.g. wired peripherals (e.g. USB, HDMI) and/or wireless peripherals (e.g. via Bluetooth, WiFi, Miracast) using Bluetooth/WiFi pairing and configuration protocols known as such. Wireless docking entails a portable device (i.e. wireless dockee or WD) to wirelessly connect to the WDH to execute the wireless docking protocol. The wireless docking protocol consists of a set of wireless messaging and streaming/control protocols between the WD and WDH that enable a WD to discover information about the peripherals being offered for docking by the WDH (pre-association and/or post-association), select a set of peripherals to dock with, and set up a streaming/control connection to these selected peripherals (e.g. using protocols such as Miracast or by USB tunneling over Wi-Fi).

Peripherals may be separate devices attached by wire to the WDH (e.g. using USB, HDMI, DVI/VGA, audio jack). Peripherals may also be wirelessly connected to the WDH (e.g. using Bluetooth, Wi-Fi). Peripherals may also be internal subsystems of the WDH (e.g. connected using PCIe or other internal busses). We call the initial set of peripherals, when no WD is docked with the WDH yet, the initial wireless docking environment. A WD that connects to the WDH for docking can select a subset or the full set of peripherals of the initial wireless docking environment to dock with. This may be done by selecting each peripheral individually or by selecting a subset or the full set at once.

Subsequently, the wireless docking environment may be extended by coupling to one or more dockee peripherals distributed across one or more potable dockees. The coupling of the dockee peripherals may use the proposed wireless docking and configuration protocols as elucidated hereafter. The now extended wireless docking environment may be selected by a further dockee for docking using a wireless docking protocol known as such. The further dockee will now perceive a set of peripherals being available, the set including both the traditional peripherals and the coupled dockee peripherals.

In order to enable the proposed extension by adding of dockee peripherals to the wireless docking environment, the WDH may be equipped with one or more Wi-Fi radios to enable the WDH to have k+1 (with k≥1) wireless connections simultaneously. The WDH may further be enabled to enter a configuration mode in which the initial wireless docking environment can be extended. When a first wireless dockee WD1 is connected to the WDH, the WDH may enter this configuration mode, for example through one of the following methods:
1) Automatically upon detection of a wireless dockee being connected (for docking purposes).
2) Initiated by a user of the WDH, e.g. through a local user interface, or a remote user interface (e.g. HTML page) provided by the WDH.
3) Initiated by wireless dockee WD1 or another wireless dockee, e.g. by sending a particular configuration message in the wireless docking protocol to the WDH. To this end, the WDH may listen for example to a particular TCP/IP port for a REQUEST_SESSION message to a particular docking configuration service offered by the WDH, or the WDH may support for example a particular UPnP action (e.g. EnterConfigurationMode( )) offered by a UPnP Docking service.

When the WDH is in the above mentioned configuration mode, the WDH requests wireless dockee WD1 to provide information about its capabilities, in particular if there is any function/capability/subsystem that is or can be made available as a dockee peripheral for other dockees. This could be done by sending for example an 802.11 Probe Request frame or an 802.11u GAS frame with some additional fields indicating the requested information to the WD, or by sending a particular message (e.g. RequestDockingPeripheralCapabilities) to a docking configuration service offered by the WD on a particular TCP/IP port.

Upon receiving one of these messages (or a follow-up message), wireless dockee WD1 may request its user if it is OK to provide one or more of its functions/capabilities/subsystems as dockee peripheral for other wireless dockees to dock with. The user may selectively or automatically choose one or more functions/capabilities/subsystems to be made available as dockee peripherals. Alternatively, the WD may be (pre-)configured to automatically agree with providing (some of) its functions/capabilities/subsystems as dockee peripherals for other wireless dockees to dock with. As a result of this, wireless dockee WD1 determines whether the functions/capabilities/subsystems are made available as dockee peripherals. For example:

Microphone input may be made available as USB Audio device class with input terminal type Microphone (0x0201);

Speaker output may be made available as USB Audio device class with output terminal type Speaker (0x0301);

Camera input may be made available as USB Video device class with input terminal type Camera (0x0201);

Display output may be made available as USB AV device class with video type DISPLAY or as Miracast sink;

Keyboard/mouse/touch input may be made available as USB HID device class;

Light/temperature sensors may be made available as USB HID device class with the appropriate sensor type;

Orientation sensors may be made available as USB HID device class with the appropriate sensor type;

GPS sensors may be made available as USB HID device class with the appropriate sensor type. Various USB HID devices are described in http://www.usb.org/developers/hidpage/HUTRR39b.pdf)

The benefits of making these functions/capabilities/subsystems available for use as low level peripherals (such as USB peripherals) instead of making functions or content available using application layer protocols (e.g. DLNA) is that these peripherals when being docked will simply appear as peripherals in the Operating System managed device list of a wireless dockee, and can be enumerated and used as if it were a locally connected peripheral (e.g. USB peripheral). This provides transparent application use of these peripherals. In case of USB peripherals being made available through USB tunneling over Wi-Fi, applications on a WD can use standard USB enumeration and any standard USB driver command for controlling these USB peripherals.

Wireless dockee WD1 may advertise the dockee peripherals as such to the WDH using a capability message. For USB peripherals it may offer access through a USB tunneling over Wi-Fi service and protocol (e.g. USB/IP). Advertisement of these peripherals (e.g. their capabilities, their USB descriptors, service identifiers, TCP/UDP ports being used, etc.) may be done through pre-association messages such as through some additional fields in a 802.11 Probe Response or 802.11u GAS Service response, or may be done through a post-association message such as by sending information about the Dockee peripherals in a UPnP message "AddNewPeripherals" e.g. offered as part of a UPnP Docking Configuration service.

The WDH will store connection data provided by WD1. The connection data may comprise information necessary for connecting to WD1 and information about the dockee peripherals. The WDH will add these as peripherals to the wireless docking environment and start advertising these additional peripherals to enable docking with other WDs e.g. using its docking service specific pre-association or post-association messages or payloads.

In an embodiment the host processor is arranged for setting up a session to the dockee peripheral via said coupling request, and the dockee processor is arranged for providing the control of the dockee peripheral via said session. So the host obtains information about the dockee peripheral and claims the peripheral for use by setting up a session to the dockee peripheral. The WDH may get active control of the peripheral, preventing that it can be used by other parties (including WD1 itself) for faster access later once a further dockee docks For example for obtaining the information about WD1's dockee peripherals and obtaining control of the dockee peripheral by the host, the WDH may request control of these peripherals and/or may request to configure them and/or gather additional detailed information about these peripherals. This can be done by setting up the session to the peripheral using a peripheral specific protocol, such as USB tunneling over Wi-Fi. By setting up a session to the peripheral the WDH can gain temporary control over the peripheral and make sure the resources of these functions/capabilities/subsystems on WD1 are properly claimed, in order to give control of these resources to another wireless dockee. Whilst being under control of the WDH or another dockee, the resources are typically not available to the user of WD1 anymore, unless some special provisions are taken, such as time scheduling or other forms of virtualization of the peripherals.

Alternatively, after storing the necessary information about the dockee peripherals of WD1, the WDH may relinquish control of the dockee peripherals back to WD1. The user of WD1 may continue to use the functions/capabilities/subsystems provided by the dockee peripherals, until a second WD docks to the WDH and selects one or more of the dockee peripherals provided by WD1. Upon selection or upon setting up a session to the dockee peripherals, the user of WD1 may get notified and may be asked to confirm if he wants to give the control of the functions/capabilities/subsystems provided by the selected dockee peripherals to the second WD.

Optionally, the user of WD1 may be enabled to request control back of his own dockee peripherals, by sending for example a "GainBackControl" UPnP message to the WDH. A typical use case for which this may be required is when the dockee audio peripherals are under control of the WDH or another dockee and a phone call comes in. After the phone call has ended the dockee may send for example a "ResumeControl" UPnP message to the WDH so that the WDH or another dockee can regain control without redoing discovery. Alternatively WD1 may simply acquire its own peripherals while needed, sent dummy or no responses to the WDH and selectively ignore data from the WDH (or combine data from the WDH with the WD1 data in the case of display or speaker data).

Since the WDH is connected via Wi-Fi to WD1, in particular through Wi-Fi Direct, it is important that another wireless dockee WD2 that wants to use the dockee peripherals provided by WD1 can do this in an efficient manner, without breaking some of the behaviour of Wi-Fi Direct. Depending on the capabilities of the WDH, WD1 and WD2 (e.g. support for concurrent connections on different Wi-Fi channels, 5 GHz/60 GHz support, multiple radio support, etc.), this may be done in one of the following ways:

1) Through WDH assisted direct pairing (or TDLS). The following steps are performed. Step a) involves assisted paring between the further dockee WD2 and the host WDH. Thereto the WDH provides the connection data to the further dockee WD2 and typically instructs both WD1 and WD2 of the credentials to be used for pairing. Step b) involves paring of the first dockee WD1 and the further dockee WD2 based on the connection data and received credentials. The final step c) involves USB tunneling over WiFi using direct connection. The WDH will temporarily relinquish control of the dockee peripherals of WD1 being used by WD2. After WD2 undocks the WDH will typically gain back control of the dockee peripherals of WD1, e.g. by re-inviting WD1 using P2P Persistent group credentials stored earlier in the WDH. Further details of pairing are described in patent application EP12182285 "Pairing within a group of wireless devices". Due to the dockee peripheral being available in the wireless docking environment as USB peripheral the wireless docking environment is extended.

2) Through WDH relaying traffic between WD1 and WD2. The USB traffic is tunneled over WiFi between the further dockee WD2 and the host WDH. Furthermore, the WDH relays the USB tunneling traffic to a further WiFi connection, and then the USB traffic is tunneled over WiFi to the first dockee WD1 that is offering the dockee peripheral so as to extend the wireless docking environment. The tunneling to WD1 is via the connection based on the connection data. In detail such USB tunneling over Wi-Fi may be done as follows:

a) When the WDH advertises the dockee peripheral offered by WD1 for docking, it may provide the connection data for connecting to this peripheral through relay in pre-association and/or post-association messages, e.g. through the Service Information field within the Service Info Descriptor format of the Response Data in an 802.11u ANQP Query Response for Wi-Fi Direct Services. The dockee connection data includes information such as:

i. The MAC address of the peripheral that another WD must use as destination address for messages/Wi-Fi frames that are meant to be sent to the peripheral. In particular since for security reasons the WDH will likely form a separate P2P group with another WD for docking than the P2P group it forms with WD1, this MAC address may be in a different subnet/address space, that is otherwise not known for the another dockee.

ii. The name/identifier of the service that WD1 offers for enabling USB tunneling over Wi-Fi (e.g. the name used within Wi-Fi Direct services framework, such as org.usb.audiodevice).

iii. Port number that needs to be used for communication with the service that WD1 offers for enabling USB tunneling over Wi-Fi.

b) Once the another wireless dockee WD2 connects to the WDH for docking, and has selected the dockee peripheral provided by WD1, it uses the dockee connection data received in step a) for setting up a session to the service that WD1 offers for enabling USB tunneling over Wi-Fi. Although the session needs to be set up between WD2 and WD1, the session initialization request (e.g. REQUEST_SESSION message on a Wi-Fi Direct service control port) should be destined at the WDH, since the WDH is likely to already have a session based on the dockee connection data with WD1 for control purposes, and a second session may be refused by WD1. The WDH may have to close its session with WD1, and re-establish a new session on behalf of WD2.
c) Once the session between WD2 and WD1 is established, the WDH will relay any messages from WD2 destined at the MAC address indicated in step a, to WD1, and will relay any USB tunneling over Wi-Fi return messages or any incoming USB tunneling over Wi-Fi at the WDH, to WD2.
d) Once the WDH detects that WD2 has closed the session with the USB tunneling over Wi-Fi service, or has undocked, or has deselected the dockee peripheral being used, or has gone out of range (and did not send a keep-alive message in time), the WDH may re-establish the session based on the dockee connection data with WD1 to regain control of the dockee peripheral of WD1. In order to do so it may need to re-establish the P2P group between WDH and WD1. This can be done by using previously stored dockee connection data, e.g. credentials for setting up a persistent P2P group.

Figure 3:
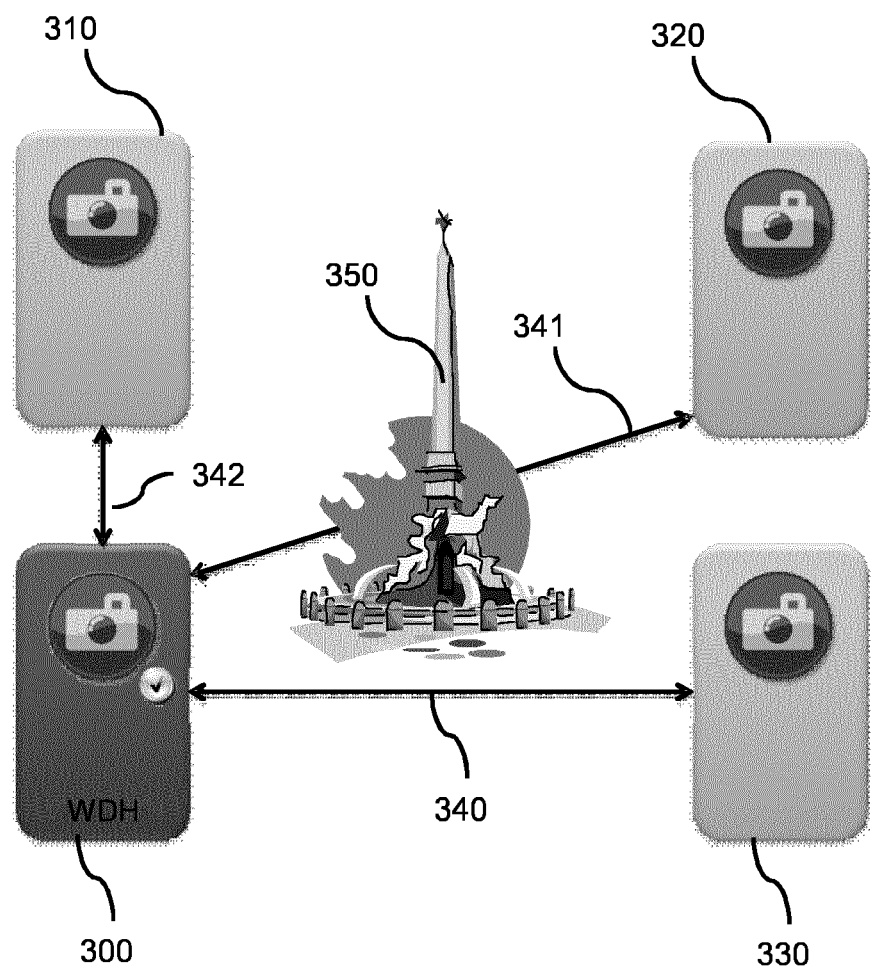
FIG. 3 shows an example of a wireless docking system performing a combined photo function.

FIG. 3 shows an example of a wireless docking system performing a combined photo function. A first mobile device performs the function of wireless docking host WDH 300, the host providing its own camera as a peripheral in the wireless docking environment. Three dockees 310,320,330 are wirelessly docked in the wireless docking environment accommodated by the host, the dockees each providing a camera as dockee peripheral, as indicated by bidirectional arrows 340, 341 and 342. The host, or one of the dockees, has an application program operational to make a combined photo of an object 350. The application program uses, as peripherals, all available camera peripherals. The application further triggers making simultaneous photos by activating all peripheral cameras.

In practice, a family or a group of travelers may be visiting a monument of which they want to make a 360 degrees picture. Their smartphones are docked to a WDH and make their camera available as a dockee peripheral, as part of the extended wireless docking environment that a further smartphone can dock with. Once the further smartphone is docked with the WDH, the operating system of the smartphone enumerates all the peripherals as part of its (plug & play) device management function. The further dockee, for example, has the photo application for taking a combined panoramic picture. The picture taking application can ask the operating system to provide access to these peripherals, and sends separate instructions to each device for proper positioning around the monument. These device instructions can be provided to the device using specific device instructions over the wireless medium (e.g. using Wi-Fi Serial Bus or Media Agnostic USB). User instructions (e.g. for user positioning around the object to be photographed) may be shown on the owner's screen in text and/or graphical format, or on each WD's display, by using the respective dockee displays (or a part of the displays) as display peripherals. When all devices are positioned properly one of the devices triggers all devices to take the picture simultaneously with aligned camera settings. Each individual picture is locally processed to allow for seamless stitching of the overall (360 degrees) pictures. Combining the results is done by the picture taking app after fetching the (pre-processed) pictures from all devices.

In order to combine capabilities one or more of the following may be provided by the docking system:

Control mechanism for a further WD over a first WD's function/capability/subsystem. Once in use by the second WD (e.g. as USB host), a docked peripheral function basically becomes a slave from the second WD. The first WD basically loses control of this function/capability/subsystem, unless some shared/simultaneous control over the same peripheral is enabled by the first WD.

Coordination protocol to allow the first WD to use the peripheral function again if the second WD is not using it (for a while, time-multiplexed), or has relinquished control of the peripheral function (e.g. by initiating an undock action).

Control mechanism for combining data from and distribution of instructions to multiple devices. This mechanism may either be provided by the WDH or be distributed among the docking devices. One particular instance would be to use the USB subsystem in conjunction with USB tunneling over Wi-Fi (e.g. using USB/IP or Wi-Fi Serial Bus or Media Agnostic USB).

Synchronization mechanism(s) for example to align data transfer between devices, e.g. align camera shutters when taking a combined picture or to synchronize audio data for multi-channel sound. This mechanism may either be provided by the WDH or the second WD. In the case the USB subsystem is used the USB Host on the second WD can synchronize its instructions to each of the peripheral devices.

Instructor application(s) for instructing individual users on where to stand, how to hold their devices and which other actions to take.

Virtualization of a WD's function/capabilities.

Control over activating a WD's functions to become part of the extended wireless docking environment, e.g. automatic, versus allowing user of a WD to reject certain functions to become available.

An operating system capable of listing the peripherals in the extended wireless docking environment as part of its plug & play device management function, enabling the (automatic) installation of drivers to use these peripherals, so that a WD can start use these peripherals provided by another WD as if they were present in the device itself.

The proposed extended wireless docking environment enables aggregating input from multiple similar peripherals that are simultaneously active, and process the inputs to generate a combined output by combining/correlating/interpolating/detecting overlap between the different inputs. By the virtue that WDs are mobile devices, and hence are located at different spots within a certain area (e.g. within a room or within wireless range of a WDH), it enables some powerful applications in a simple, low cost manner.

Below is a list of example applications that are enabled:

Combine the input from the different microphones within the extended wireless docking environment (i.e. coming from multiple nearby devices) to form a microphone array. The result of this would be a much higher quality result signal. For example if a meeting is taking place in a (large) physical meeting room with multiple participants, and all participants would dock their mobile phones with the meeting room's WDH, one of the participants (e.g. the chair) of the meeting could collect the input from all microphones from the mobile phones from each of the participants and generate a high quality output signal for remote participants (e.g. participating in the meeting by phone). By interpolating the different input signals from the microphone array formed by the microphones from the different WDs in the extended wireless docking environment, one can make the voices from all participants appear to be close to the microphone.

Other benefits of combining different microphone signals in this manner could be to record music, speeches etc. as surround sound and with much higher quality in a very easy low-cost manner.

- Combine the output from the different speakers within the extended wireless docking environment to create a virtual surround sound experience.
- Combine the input from the different cameras within the extended wireless docking environment to create panoramic or 3D pictures/videos.
- Combine the output from the different displays within the extended wireless docking environment to form a larger display (for example a map or a board game) or show multiple copies of the same display output on all WDs (e.g. quiz or exam questions) or represent different views or elements from a user interface (e.g. to do a collaborative task or show different views on a 3D world).
- Combine the input from the different keyboard/mouse/touch input devices within the extended wireless docking environment for collaborative purposes, such as multi-player gaming. For example the orientation sensor from a one of the WDs can be used for controlling a pointer on the WDH's docking screen. In this case the WD can be considered as a virtual (laser pointer) peripheral for the WDH. Thus anyone one in the room can move or point at a certain presentation item without having to move in front of the screen. Another similar example would be that the (virtual) keys of a secondary WD are temporarily used to control the primary WD's presentation.
- Combine the input from different light or temperature sensors within the extended wireless docking environment to create temperature or light maps of the environment for light (including the WDH's screen brightness/contrast/color) or climate control purposes.

If required a synchronization mechanism for peripheral data and or control of multiple dockees can be implemented using the Network Time Protocol (NTP) or the Wi-Fi Timing Synchronisation Function (TSF) or alike. These protocols allows for clock synchronization of devices within a P2P group. The latest version of NTP (NTPv4, RFC5905) may achieve microsecond accuracy in interference free LANs using software implementations. NTP is defined by the Internet Engineering Task Force (IETF) in Request for Comments 5905, ISSN: 2070-1721, available via https://tools.ietf.org/html/rfc5905.

Devices may send and receive timestamps using the UDP, TCP or RTP protocol and these timestamps can be used to synchronize the data from/to multiple devices as required. Proper synchronization of data will be important for audio peripherals (microphones, speakers) and video peripherals (camera, display), but may not be excluded to these. In the example of FIG. 3, the camera's may be individually triggered using a PTP [Picture Transfer Protocol, PIMA 15740] InitiateCapture or Vendor Specific capture command over USB if the devices support the Still Image device class. Said PTP is further described in "Photography—Electronic still picture imaging—Picture Transfer Protocol (PTP) for Digital Still Photography Devices, PIMA 15740:2000, Approved Jul. 5, 2000, FIRST EDITION", available via http://people.ece.cornell.edu/land/courses/ece4760/FinalProjects/f2012/jmv87/site/files/pima 15740-2000.pdf, while USB is further described in "Universal Serial Bus Still Image Capture Device Definition, Revision 1.0, Jul. 11, 2000", available via http://www.usb.org/developers/devclass_docs/usb_still_img10.pdf.

It is up to the WDH to send the commands for each camera as simultaneous as possible to minimize mutual delays and to compensate for transfer delay when triggering its own camera. If the trigger delay for each camera is known or can be determined the WDH may take this into account when sending the individual capture commands.

For audio channels synchronization can be accomplished for example by using the "Inter Channel Synchronization" method as described in the USB device Class Definition for Audio Devices (V1.0, section 3.4), which is further described in "Universal Serial Bus Device Class Definition for Audio Devices, Release 1.0, Mar. 18, 1998" available via http://www.usb.org/developers/devclass_docs/audio10.pdf.

It is noted that new or other peripherals may be combined in a similar way and other examples and applications are possible. Also two or more elements as listed may be combined. For example the users may be instructed for a physical alignment of their devices based on position and orientation sensors for forming a large display or simultaneously taking a panoramic picture.

Optionally, the extended wireless docking environment may be arranged to trigger multiple peripherals in the extended wireless docking environment to be activated at a specific (short) time interval, e.g. based on a trigger from a user or control application.

Applications may include:
- Security applications that would require multiple users to simultaneously press a button or a specific key to unlock a certain secret.
- Taking pictures: you could create an instant panoramic shot of a scene, or have a synchronized light flash in a dark environment.

Optionally, the peripherals available in the extended wireless docking environment enable an application to determine the relative position/distance between the different WDs and between the WDs and the WDH and to use this information inside a control function, for example:
- Generating sound(s) using one or more speakers within the extended wireless docking environment and at the same time use one or more microphones within the extended wireless docking environment to capture the generated sound. By measuring the volumes, quality and contents of the captured sounds and correlating this with information about the generated sounds, relative positions between the different WDs can be determined.
- By using the different GPS/position and orientation sensor(s) within the extended wireless docking environment to determine relative position information. This relative position information can then be used to instruct users on physical alignment to form a figure or pattern for entertainment, strategic or collaborative purposes.
- By interpolating wireless signal strengths and quality levels received from the different wireless connectivity/communication functions within the extended wireless docking environment (possibly augmented by instructing the wireless connectivity/communication functions to send some beacon or probe request/response frames) to determine relative position information.

One particular control application that can greatly benefit from this information, would be a control application that based on how far a particular WD is moving away from the WDH will undock that particular WD. This is useful for security reasons, because when a WD goes away and is still docked, other users may be able to use one of the other WDs or the WDH to interact with that particular WD and possibly misuse that device.

Although in the description above it mentions the WDH and the WDs to be separate entities, the functions of the WDH and one of the WDs may be combined in a single physical device.

The description above describes implementation options using Wi-Fi Direct (a.k.a. Wi-Fi Peer to Peer), known from the document "Wi-Fi Wi-Fi Peer-to-Peer (P2P) Technical Specification, Version 1.2, 2010", from the Wi-Fi Alliance. Wi-Fi Direct is a standard that allows Wi-Fi devices to connect to each other with no need for a wireless access point.

Figure 4:
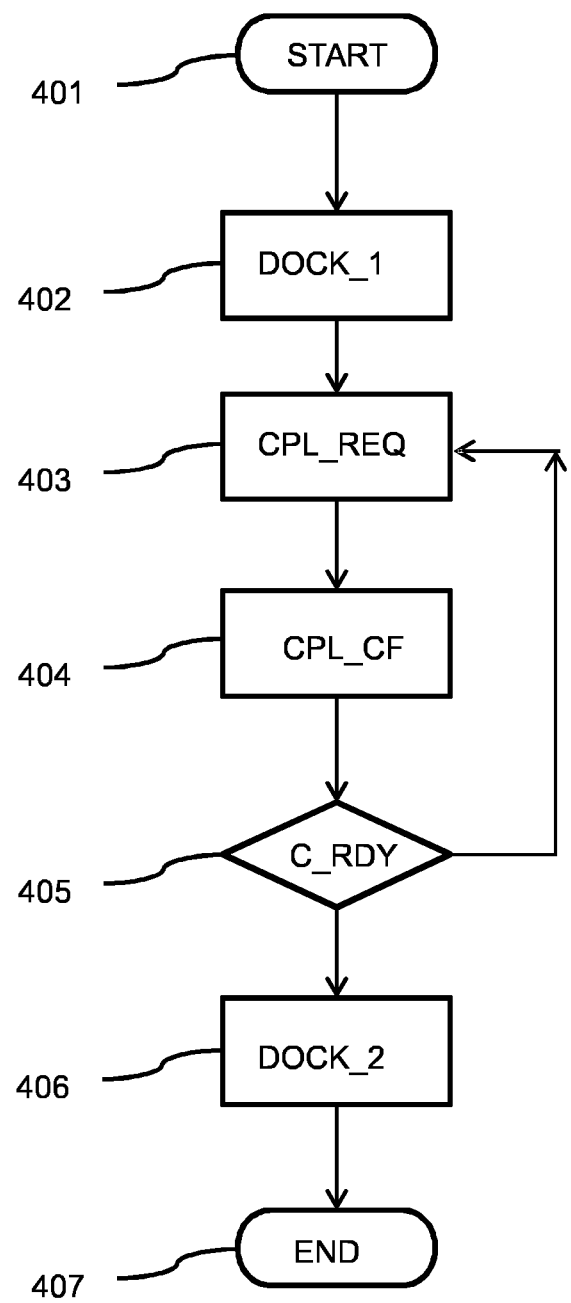
FIG. 4 shows a method of wireless docking in a host.

FIG. 4 shows a method of wireless docking in a host, to be used in a wireless docking system comprising the host and at least one dockee. The host and the dockee are arranged for wireless docking via wireless communication, and the host is arranged for accommodating at least one wireless docking environment and coupling to at least one peripheral for making the peripheral accessible in the wireless docking environment. The dockee comprises at least one dockee peripheral. The method starts at step START 401, and subsequently at step DOCK_1 402 at least one dockee is docked into the wireless docking environment for providing access to the peripheral(s) in the wireless docking environment for the dockee. Next, in step CPL_REQ 403, a coupling request is send to the dockee. If the dockee determines that a dockee peripheral is present and may be made available, the dockee sends a coupling confirmation message in step CPL_CF 404. After receiving the confirmation message the method decides whether the configuration of the wireless docking environment is ready in step C_RDY 405. If not, a further coupling request may be sent by returning to step CPL_REQ 402. When the configuration mode is finished the method proceeds to step DOCK_2 406, and the method makes the dockee peripheral accessible as a further peripheral in the wireless docking environment. Now a further dockee may dock into the wireless docking environment and get access to the dockee peripheral. The method terminates at END 407.

A complementary method (not shown) is performed at the dockee. The dockee method comprises docking into the wireless docking environment for getting access to the peripheral, and, upon receiving a coupling request from the host, coupling the dockee peripheral to the host for making the dockee peripheral accessible as a further peripheral in the wireless docking environment.

It will be appreciated that the above description for clarity has described embodiments of the invention with reference to different functional units and processors, but may be implemented in hardware and/or software, using programmable components. Any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A dockee for use in a wireless docking system accommodating a wireless docking environment, the dockee being configured to dock via wireless communication, the dockee comprising:
   a dockee communication unit configured to provide the wireless communication;
   a dockee processor configured to dock into the wireless docking environment; and
   at least one dockee internal peripheral which is internal to the dockee,
   wherein the dockee processor is configured for advertising the at least one dockee internal peripheral;
   wherein, upon receiving a coupling request from a host, the dockee processor is configured to:
      couple with the host and exchange connection data including data of peripherals coupled directly to the host and other dockee internal peripherals which are available; and
      allow control of the at least one dockee internal peripheral by the host on a device level, such that the at least one dockee internal peripheral is accessible as an additional peripheral in the wireless docking environment that is extended to include the additional peripheral, and
   wherein the dockee is configured to automatically search for a signal coming from the host to initiate the docking.

2. The dockee as claimed in claim 1, wherein the dockee processor is configured to:
   received a first synchronization command for activating a function of the at least one dockee internal peripheral when indicated by the first synchronization command; and
   generate a second synchronization command for activating a function of at least one peripheral in the wireless docking environment when indicated by the second synchronization command.

3. The dockee as claimed in claim 1, wherein the dockee processor is configured to, upon receiving a coupling request or a use request, determine whether a user of the dockee agrees to allow the host to control the at least one dockee internal peripheral.

4. The dockee as claimed in claim 1, wherein the dockee processor is configured to, when a use mode of the at least one dockee internal peripheral is engaged, determine whether a user of the dockee requires to use the dockee peripheral, and subsequently limit or terminate the use of the dockee peripheral as the additional peripheral in the wireless docking environment.

5. The dockee as claimed in claim 1, wherein the at least one dockee internal peripheral comprises at least one of a microphone, a loudspeaker, a camera, a display, a touch screen, a mouse, a keyboard, a communication unit, a light sensor, a temperature sensor, an orientation sensor, and a location sensor.

6. A host in a wireless docking system configured to dock via wireless communication, the host comprising:
- a host communication unit configured to provide the wireless communication; and
- a host processor configured to accommodate a wireless docking environment, for advertising at least one peripheral to make it available for use in the wireless docking environment, and to dock the dockee into the wireless docking environment; and
- wherein the host processor is configured to:
  - send a coupling request to the dockee and exchange connection data including data of peripherals coupled directly to the host and other dockee internal peripherals which are available, for taking control of at least one dockee internal peripheral which is internal to the dockee on a device level, and
  - advertise the at least one peripheral including the at least one dockee internal peripheral, such that the at least one dockee internal peripheral is accessible on the device level as an additional peripheral in the wireless docking environment that is extended to include the additional peripheral, and
- wherein the dockee is configured to automatically search for a signal coming from the host to initiate the docking.

7. The host as claimed in claim 6, wherein the host processor is configured to accommodate a configuration mode in which the wireless docking environment is configurable for making the at least one dockee internal peripheral accessible as the additional peripheral in the wireless docking environment.

8. The host as claimed in claim 7, wherein the host processor is configured to engage the configuration mode by at least one of:
- detection of the dockee being docked;
- a user input via a user interface of the host; and
- a configuration message from the dockee as received by the host.

9. The host as claimed in claim 7, wherein the host is configured to request the dockee to provide information regarding capabilities of the dockee.

10. The host as claimed in claim 9, wherein the dockee is available as a dockee peripheral for other dockees.

11. A method of wireless docking by a host, the method comprising:
- providing a wireless docking system comprising the host and at least one dockee;
- arranging the host and the at least one dockee for docking via wireless communication;
- accommodating a wireless docking environment;
- advertising at least one peripheral to make it accessible in the wireless docking environment;
- enabling the at least one dockee to use the at least one peripheral, the at least one dockee comprising at least one dockee internal peripheral which is internal to the dockee;
- docking the at least one dockee into the wireless docking environment;
- sending a coupling request to the at least one dockee and exchanging connection data including data of peripherals coupled directly to the host and other dockee internal peripherals which are available;
- taking control of the at least one dockee internal peripheral on a device level;
- advertising the at least one peripheral including the at least one dockee internal peripheral, such that the at least one dockee internal peripheral is accessible on the device level as an additional peripheral in the wireless docking environment that is extended to include the additional peripheral, and
- automatically searching for a signal coming from the host to initiate the docking.

12. A method of wireless docking by a dockee, the method comprising:
- providing a wireless docking system comprising a host and at least one dockee;
- arranging the host and the at least one dockee for docking via wireless communication;
- accommodating a wireless docking environment;
- advertising at least one peripheral to make it accessible in the wireless docking environment;
- enabling the at least one dockee to use the at least one peripheral, the at least one dockee comprising at least one dockee internal peripheral which is internal to the dockee;
- docking into the wireless docking environment;
- advertising the at least one dockee internal peripheral;
- coupling to the host and exchange connection data including data of peripherals coupled directly to the host and other dockee internal peripherals which are available upon receiving a coupling request from the host;
- allowing control of the at least one dockee internal peripheral by the host on a device level, such that the at least one dockee internal peripheral is accessible on the device level as an additional peripheral in the wireless docking environment that is extended to include the additional peripheral, and
- automatically searching for a signal coming from the host to initiate the docking.

13. A wireless docking system for docking via wireless communication, comprising:
- a host configured to accommodate a wireless docking environment and to advertise at least one peripheral for making the at least one peripheral available for use in the wireless docking environment, the host comprising a host processor and a host communication unit configured to provide the wireless communication; and
- a dockee comprising a dockee communication unit configured to provide the wireless communication and a dockee processor configured to dock into the wireless docking environment to enable the dockee to use the at least one peripheral;
- wherein the dockee includes at least one dockee internal peripheral which is internal to the dockee;
- wherein the dockee processor is configured to advertise the at least one dockee internal peripheral;
- wherein, upon receiving a coupling request from the host, the dockee processor is configured to couple with the host and exchange connection data including data of peripherals coupled directly to the host and other dockee internal peripherals which are available and allowing control of the at least one dockee internal peripheral by the host on a device level;
- wherein the host processor is configured to:
  - send the coupling request to the dockee in order to obtain the connection data, for taking control of the at least one dockee internal peripheral on the device level, and
  - advertise the at least one peripheral including the at least one dockee internal peripheral, such that the at least one dockee internal peripheral is accessible on the device level as an additional peripheral in the wireless docking environment that is extended to include the additional peripheral, and wherein the dockee is configured to automatically search for a signal coming from the host to initiate the docking.

14. The system as claimed in claim 13, wherein the host processor is configured to set up a session to the at least one dockee internal peripheral via the coupling request, and the dockee processor is configured to provide the control of the dockee peripheral via the session.

15. The system as claimed in claim 13, wherein the dockee processor is configured to advertise the at least one dockee internal peripheral by sending a peripheral capability signal to the host indicative of the at least one dockee internal peripheral being available for coupling as the additional peripheral, and the host processor is configured to discover the at least one dockee internal peripheral by receiving the peripheral capability signal from the dockee.

16. The system as claimed in claim 13, further comprising an additional dockee that includes an additional dockee processor configured to use the at least one dockee internal peripheral when docking into the wireless docking environment; and wherein the host processor is configured to, upon docking the additional dockee into the wireless docking environment:
 send a use request to the dockee, the use request indicating that the at least one dockee internal peripheral is to be used in the wireless docking environment, and
 accommodate transfer of signals between the at least one dockee internal peripheral and the additional dockee, the additional dockee processor being configured, upon receiving the use request from the host, to engage a use mode of the at least one dockee internal peripheral and to transfer the signals between the at least one dockee internal peripheral and the additional dockee.

17. The system as claimed in claim 13, wherein the dockee is configured to automatically search for a signal after the searching is triggered by a user.

18. The system as claimed in claim 13, wherein one or more actions to dock to the host is initiated after the signal is received.

19. The system as claimed in claim 13, wherein a wireless dockee being connected for a docking purpose.

* * * * *